Patented May 14, 1946

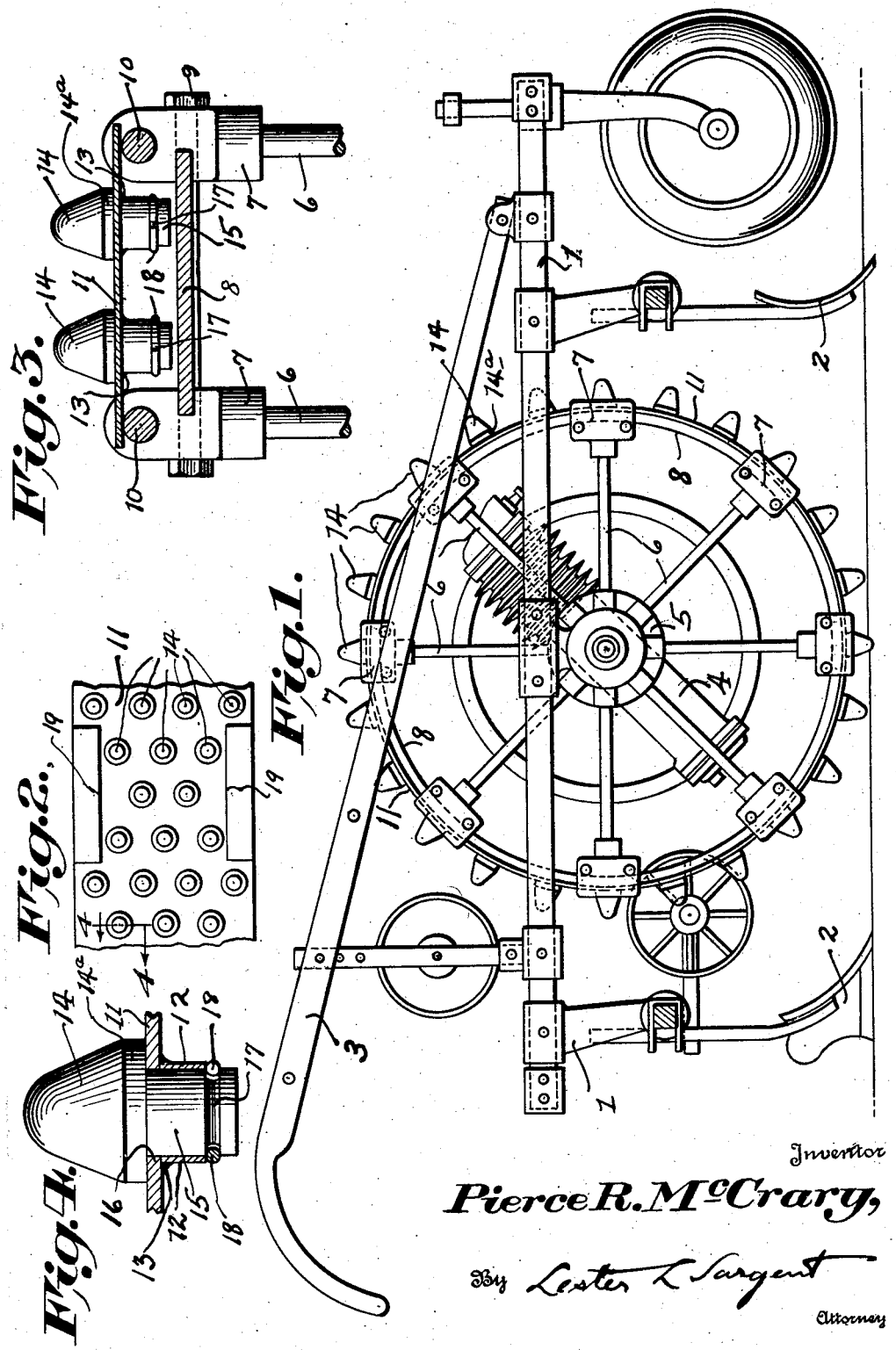

2,400,428

UNITED STATES PATENT OFFICE 2,400,428

NONSKID TIRE

Pierce Roe McCrary, Washington, D. C.

Application December 2, 1942, Serial No. 467,646

4 Claims. (Cl. 301—44)

The object of my invention is to provide a novel non-skid tire, especially adapted for use on farm tractors, as well as for automobiles, trucks and agricultural implements; and to provide a tire which will have greater traction than a conventional tread on slippery ground.

It is also my object to replace pneumatic tires on vehicles now using pneumatic tires; and to make unnecessary the rubber now required in the manufacture of solid rubber tires and of pneumatic rubber tires.

My tire is primarily intended for use on a novel type of tractor which can be manufactured at less expense and without the use of critical materials required for the prosecution of the war, which has prevented the continuance of manufacture of conventional types of tractors. It reduces or eliminates the use of rubber, and greatly reduces the amount of metal normally required in the manufacture of tractors.

It is also an object of my invention to provide a construction in which either plastic, wooden or rubber or other gum plugs may be used as the resilient element of the tire; and to provide plugs of such shape that they will not lift mud or dirt; will not permit skidding; and will always be in contact with the road or field surface and make it possible for the tractor to give a steady pull at all times.

I attain these and other objects of my invention by the mechanism illustrated in the accompanying drawing, in which—

Figure 1 is a side elevation of my invention applied to the novel type of tractor which I have devised;

Fig. 2 is a detail face or plan view of a portion of the outer rim of my tire;

Fig. 3 is a transverse section through my tire;

Fig. 4 is a detail sectional view on line 4—4 of Fig. 2, the plug being shown in side elevation.

Like numerals designate like parts in each of the several views.

Referring to the accompanying drawing, I provide a novel tractor frame 1, having suitable manual or other guiding means 3, and carrying suitable agricultural implements or elements 2. My tractor is driven by a novel gyroscopic engine 4 (which has been described and claimed in a co-pending application Serial 431,771 filed February 20, 1942, which matured into patent No. 2,311,064, February 16, 1943, and which is mounted on the hub 5 of the main driving wheel, said hub having spokes 6 on which is mounted my novel tire. At the outer end of the spokes 6 are castings 7, arranged in pairs and engaging opposite cut-out portions 19 of the tire or rim 11, and also engaging the transverse spacer bar 8, which is bolted to members 7 by bolts 9.

The rim 11 is provided with a multiplicity of symmetrically arranged openings 16, and on the underside of said rim surrounding or contiguous to said openings are preferably cylindrical thimbles 12, suitably welded to the rim 11. Mounted in each of the openings 11 is a preferably cylindrical stem or extension 15 of a plug 14 which is preferably of approximate acorn shape, with its base portion 14a projecting over an annular portion of the surface of tire 11 immediately adjacent the opening 15, as shown in Fig. 4 of the drawing.

The stem or extension 15 of the plug 14 is provided with an annular groove 17, in which is mounted a split expansion ring 18, which is compressed for insertion through the thimble but then expands and projects sufficiently beyond the surface of stem 15 to engage the bottom end or edge of thimble 12 and securely hold the plug in its position on the tire 11, as shown in Figs. 3 and 4. Spaced from the lower ends of the stems 15 of plugs 14 is the spacer bar 8 which is mounted in the castings 7 carried by the pairs of spokes 6, as shown in Fig. 3. The wheel is reinforced by rings 10 which are mounted in the castings 7, preferably near their outer ends, as shown in Fig. 3.

The plugs 14 (and their stems 15) may be made of wood, plastic, rubber, or of any other suitable resilient gum, such as balata. Owing to their acorn-like shape they will not pick up mud or dirt, but will give effective traction in mud or slippery ground. If made of rubber or other gum, the plugs will afford the necessary resilience not only for automobiles and for tractors but for trucks and other vehicles which have heretofore used either solid rubber tires or pneumatic tires. Even if made of wood (treated to make it waterproof) or plastic they will be more resilient than the metal tires now in use on tractors, of conventional construction.

The cost of construction it is estimated will be seventy-five per cent less than that for corresponding tires of the pneumatic type. The plugs are inexpensive, and the split ring device makes it possible to easily replace any damaged plug by compressing the split ring and withdrawing the plug through the thimble 12 and inserting a new plug on the thimble 12 and again seating the split ring 18 in the annular groove 17 of the stem 15. Plugs 14 may be of metal or other suitable materials, as desired.

The tire will operate satisfactorily in either mud or sand, and will not mar a lawn, nor injure hard-surfaced roads. This tire will wear for a long time, and any worn or damaged plug can be readily replaced without disturbing other plugs.

I claim:

1. In combination with a tire rim having a series of spaced openings therein, and having a series of thimbles welded to the underside of said rim adjacent said openings, a multiplicity of plugs preferably having acorn-like portions, and having cylindrical stems of less diameter than the base of the aforesaid acorn-like portions, the stems of the plugs filling the thimbles, said stems having annular grooves positioned at a point beyond the aforesaid thimbles, and split expansion rings insertible through the aforesaid thimbles and seated in the aforesaid annular grooves to function as retaining elements for the plugs.

2. In combination with the rim of a tire having openings therein and having thimbles adjacent the openings on the inner side of the rim, plugs of non-metallic material and of substantially acorn-like shape having their base portions of greater area than the openings through the tire rim, the plugs having cylindrical extensions of smaller diameter throughout than the aforesaid base portions, the stems of the plugs filling the thimbles, said cylindrical extensions having an annular groove to receive a retaining element at a point beyond the aforesaid thimble, and a retaining element seating in said annular groove.

3. In combination with a tire having a rim, a series of spaced openings therein, a series of thimbles welded to the underside of said rim adjacent said openings, a multiplicity of resilient plugs having acorn-like portions, and having cylindrical stems of less diameter than the base of the aforesaid acorn-like portions, said stems filling the aforesaid thimbles, and means detachably secured to the stems and engaging the ends of the aforesaid thimbles to secure the plugs in place in the thimbles.

4. In combination with a tire having a rim, a series of spaced openings therein, a series of thimbles extending inwardly from the underside of said rim adjacent said openings, a multiplicity of resilient plugs having cylindrical stems of less diameter than the base of the outer portions of said plugs, said stems filling the aforesaid thimbles, said stems having annular grooves on their inner end portions, and expansion rings insertible in the grooved portion of the plugs before the plugs are inserted in the thimbles and adapted to engage the inner ends of the thimbles to secure the plugs in place on the rim, while permitting of removal of any individual plug for replacement purposes.

PIERCE ROE McCRARY.